D. C. MATTESON & T. P. WILLIAMSON.
Gage-Wheels for Gang-Plows and Cultivators.
No. 154,182. Patented Aug. 18, 1874.

Witnesses.
E. McQuesten.

Inventors
D. C. Matteson
T. P. Williamson
By E. W. M. Smith, Atty

UNITED STATES PATENT OFFICE.

DON CARLOS MATTESON AND TRUMAN P. WILLIAMSON, OF STOCKTON, CALIFORNIA.

IMPROVEMENT IN GAGE-WHEELS FOR GANG-PLOWS AND CULTIVATORS.

Specification forming part of Letters Patent No. 154,182, dated August 18, 1874; application filed February 10, 1874.

*To all whom it may concern:*

Be it known that we, DON CARLOS MATTESON and TRUMAN P. WILLIAMSON, of Stockton, in the county of San Joaquin and State of California, have invented an Improved Gage-Wheel for Gang-Plows and Cultivators; and we do hereby declare that the following is a full, clear, and exact description of the same, reference being had to the accompanying drawings and to the letters marked thereon.

Our invention relates to certain improvements in gage-wheels of cultivators or gang-plows, which are liable to become covered with mud or dust, which has a tendency to work into the journals; and it consists in the employment, with a recessed wheel, of a box having an arm and securing-bolt, by means of which the journal is protected, and the box may be readily removed in case it becomes worn, as will be fully described hereinafter.

Figure 1:
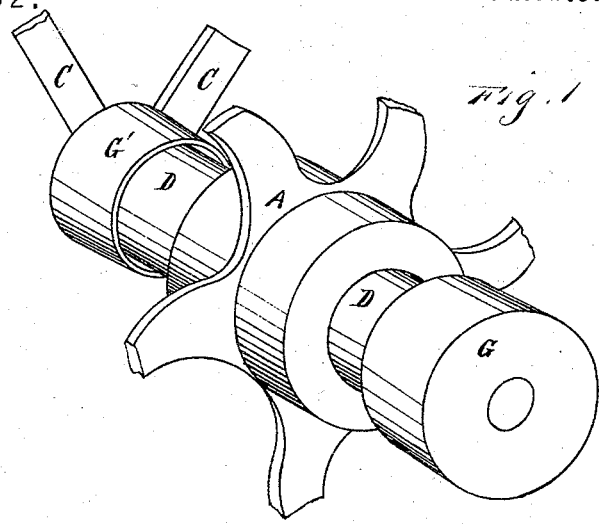
Figure 2:
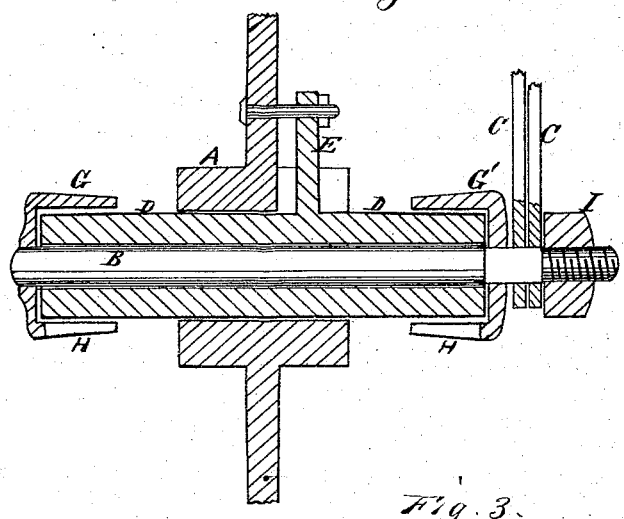
Figure 3:
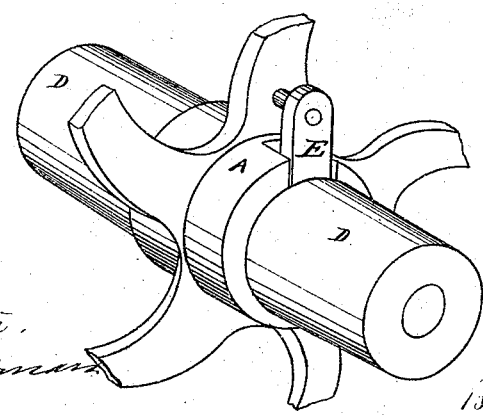

Referring to the accompanying drawings for a more complete explanation of our invention, Figure 1 is a perspective view of the hub of our wheel with its caps. Fig. 2 is a longitudinal section of the hub and box, showing the axle. Fig. 3 is a perspective view, showing the manner of securing the box to the wheel-hub.

A is a wheel-hub, which, in the present case, is represented as the gage-wheel of a gang-plow or cultivator. This wheel is mounted upon a stationary axle, B, and this axle is supported by the adjustable arms C, which are secured to the plow-frame. In order to render the box D removable and easy to renew when it is worn out, we make the hub of the wheel large enough to receive the box, which fits it closely. An arm or lug, E, extends up from one side of the box, and this lug fits into a slot made for it in the side of the hub, as shown at Fig. 3. A bolt, F, passes through one of the spokes or arms of the wheel, and through the lug E, thus holding the box securely in place. The axle B is square where it passes through the arms C, and is thus securely held in place. The caps G G', which keep out the dust and dirt, are fastened to the ends of the axle, and project over the ends of the box, as shown, fitting closely against the ends of the box. Slots H are formed at the under side of the caps to free them from anything which may get into them. The arms C are secured outside the cap, at one end, by a nut, I.

Having thus described our invention, what we claim as new, and desire to secure by Letters Patent, is—

The recessed wheel A, with the box D, having the arm E and securing-bolt, as described.

In witness whereof we have hereunto set our hands and seals.

DON CARLOS MATTESON. [L. S.]
TRUMAN PAUL WILLIAMSON. [L. S.]

Witnesses:
    D. O. HARELSON,
    R. E. WILHOIT.